(12) United States Patent
Wawruch

(10) Patent No.: US 12,332,438 B2
(45) Date of Patent: Jun. 17, 2025

(54) COLOR CALIBRATION TOOL FOR SEE-THROUGH AUGMENTED REALITY ENVIRONMENT

(71) Applicant: Snap Inc., Santa Monica, CA (US)

(72) Inventor: Pawel Wawruch, Yverdon-les-Bains (CH)

(73) Assignee: Snap Inc., Santa Monica, CA (US)

( * ) Notice: Subject to any disclaimer, the term of this patent is extended or adjusted under 35 U.S.C. 154(b) by 29 days.

(21) Appl. No.: 17/848,179

(22) Filed: Jun. 23, 2022

(65) Prior Publication Data
US 2023/0418062 A1    Dec. 28, 2023

(51) Int. Cl.
*G02B 27/01* (2006.01)
*G06F 3/04847* (2022.01)
*G06T 19/00* (2011.01)
*G06T 19/20* (2011.01)

(52) U.S. Cl.
CPC ....... *G02B 27/017* (2013.01); *G06F 3/04847* (2013.01); *G06T 19/006* (2013.01); *G06T 19/20* (2013.01); *G02B 2027/0178* (2013.01); *G06T 2219/2012* (2013.01)

(58) Field of Classification Search
CPC .......... G02B 27/017; G02B 2027/0178; G06F 3/04847; G06T 19/006; G06T 19/20; G06T 2219/2012
See application file for complete search history.

(56) References Cited

U.S. PATENT DOCUMENTS

| | | | |
|---|---|---|---|
| 5,638,117 A * | 6/1997 | Engeldrum | H04N 17/04 348/E17.005 |
| 5,670,985 A | 9/1997 | Cappels, Sr. et al. | |
| 7,971,156 B2 | 6/2011 | Albertson et al. | |

(Continued)

FOREIGN PATENT DOCUMENTS

| CN | 103049761 B | 8/2016 |
|---|---|---|
| EP | 3707693 A1 | 9/2020 |

(Continued)

OTHER PUBLICATIONS

"International Application Serial No. PCT/US2023/068771, International Search Report mailed Sep. 22, 2023", 3 pgs.

(Continued)

*Primary Examiner* — Abderrahim Merouan
(74) *Attorney, Agent, or Firm* — Schwegman Lundberg & Woessner, P.A.

(57) ABSTRACT

A color calibration system is configured to permit a user to adjust tint/temperature parameters while displaying a virtual color reference card on a see-through display of a computing device. The virtual color reference card corresponds to a physical color reference card that is placed in front of the AR glasses. Based on the adjustments made by the user via the color calibration UI, the color calibration system makes changes to the color properties of the see-through display. The user can continue adjusting the properties of the see-through display by interacting with the user-selectable elements in the color calibration UI, until the colors of the virtual color reference card overlayed over the field of view of the wearer of the AR glasses match the colors of the physical color reference card seen by the wearer of the AR glasses.

16 Claims, 7 Drawing Sheets

(56) References Cited

U.S. PATENT DOCUMENTS

| | | | |
|---|---|---|---|
| 7,996,793 B2 | 8/2011 | Latta et al. | |
| 8,103,094 B2* | 1/2012 | Wilensky | H04N 23/88 |
| | | | 358/518 |
| 8,421,826 B2* | 4/2013 | Hsieh | G09G 5/00 |
| | | | 345/589 |
| 8,487,938 B2* | 7/2013 | Latta | G06F 3/017 |
| | | | 345/475 |
| 8,619,101 B2* | 12/2013 | Marcu | G09G 3/2003 |
| | | | 345/589 |
| 8,711,187 B2* | 4/2014 | Park | H04N 21/4316 |
| | | | 345/20 |
| 8,856,691 B2 | 10/2014 | Geisner et al. | |
| 9,179,044 B2* | 11/2015 | Zeng | H04N 1/6033 |
| 9,225,897 B1 | 12/2015 | Sehn et al. | |
| 9,230,160 B1 | 1/2016 | Kanter | |
| 9,276,886 B1 | 3/2016 | Samaranayake | |
| 9,652,897 B2* | 5/2017 | Osborn | G06T 11/40 |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,302,287 B1* | 4/2022 | Allard | G09G 5/363 |
| 11,307,747 B2 | 4/2022 | Dancie et al. | |
| 11,531,402 B1 | 12/2022 | Stolzenberg | |
| 11,546,505 B2 | 1/2023 | Canberk | |
| 2007/0065006 A1* | 3/2007 | Wilensky | H04N 23/88 |
| | | | 348/E9.04 |
| 2008/0062442 A1* | 3/2008 | Olson | H04N 1/6011 |
| | | | 358/1.9 |
| 2009/0012788 A1 | 1/2009 | Gilbert et al. | |
| 2011/0301934 A1 | 12/2011 | Tardif | |
| 2014/0171036 A1 | 6/2014 | Simmons | |
| 2014/0368530 A1* | 12/2014 | James | G06T 11/001 |
| | | | 345/593 |
| 2015/0022830 A1* | 1/2015 | Kwak | G06K 15/1878 |
| | | | 358/1.6 |
| 2015/0120293 A1 | 4/2015 | Wohlert et al. | |
| 2015/0370320 A1 | 12/2015 | Connor | |
| 2016/0379396 A1* | 12/2016 | Pandey | G06T 11/001 |
| | | | 345/589 |
| 2017/0061694 A1* | 3/2017 | Giraldi | G06F 3/16 |
| 2017/0123487 A1 | 5/2017 | Hazra et al. | |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2019/0146219 A1 | 5/2019 | Rodriguez, II | |
| 2019/0362478 A1* | 11/2019 | Nanda | G06T 7/90 |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0224889 A1* | 7/2021 | Colby | G06T 7/90 |
| 2021/0241529 A1 | 8/2021 | Cowburn et al. | |
| 2021/0267732 A1* | 9/2021 | Kikkawa | A61C 15/02 |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0252882 A1* | 8/2022 | Berliner | G06F 3/017 |
| 2022/0255995 A1* | 8/2022 | Berliner | G06T 15/20 |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2023/0007085 A1* | 1/2023 | Berliner | G06F 3/04815 |
| 2023/0044356 A1* | 2/2023 | Todd | G06F 3/0482 |
| 2023/0247742 A1* | 8/2023 | Slivka | H05B 47/175 |
| | | | 315/291 |
| 2023/0289030 A1* | 9/2023 | Sullivan | G06V 10/82 |
| 2023/0394727 A1* | 12/2023 | Clark | H04N 1/6088 |

FOREIGN PATENT DOCUMENTS

| | | |
|---|---|---|
| EP | 3985382 A1 | 4/2022 |
| EP | 4172726 A1 | 5/2023 |
| EP | 4172730 A1 | 5/2023 |
| KR | 20220158824 A | 12/2022 |
| WO | WO-2016168591 A1 | 10/2016 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023250346 A1 | 12/2023 |

OTHER PUBLICATIONS

"International Application Serial No. PCT/US2023/068771, Written Opinion mailed Sep. 22, 2023", 5 pgs.

* cited by examiner

COLOR CALIBRATION TOOL FOR SEE-THROUGH AUGMENTED REALITY ENVIRONMENT

TECHNICAL FIELD

The present disclosure relates generally to facilitating augmented reality experiences.

BACKGROUND

As the popularity of computer-implemented tools that permit users to access and interact with content and other users online continues to grow, various computer-implemented tools are being developed to permit users to share content with other users through messaging clients. Some of such computer-implemented applications, termed apps, can be designed to run on a mobile device such as a phone, a tablet, or a wearable device, while having a backend service provided on a server computer system to perform operations that may require resources greater than is reasonable to perform at a client device.

Various computer-implemented tools are being developed to permit users to experience so-called augmented reality. Augmented reality, often abbreviated as AR, is an environment, in which the real world, as viewed through a camera lens, for example, is augmented by overlaying digital content over the view of the real world presented on the display of a user device. Examples of user devices include AR glasses, a tablet, and a smartphone.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
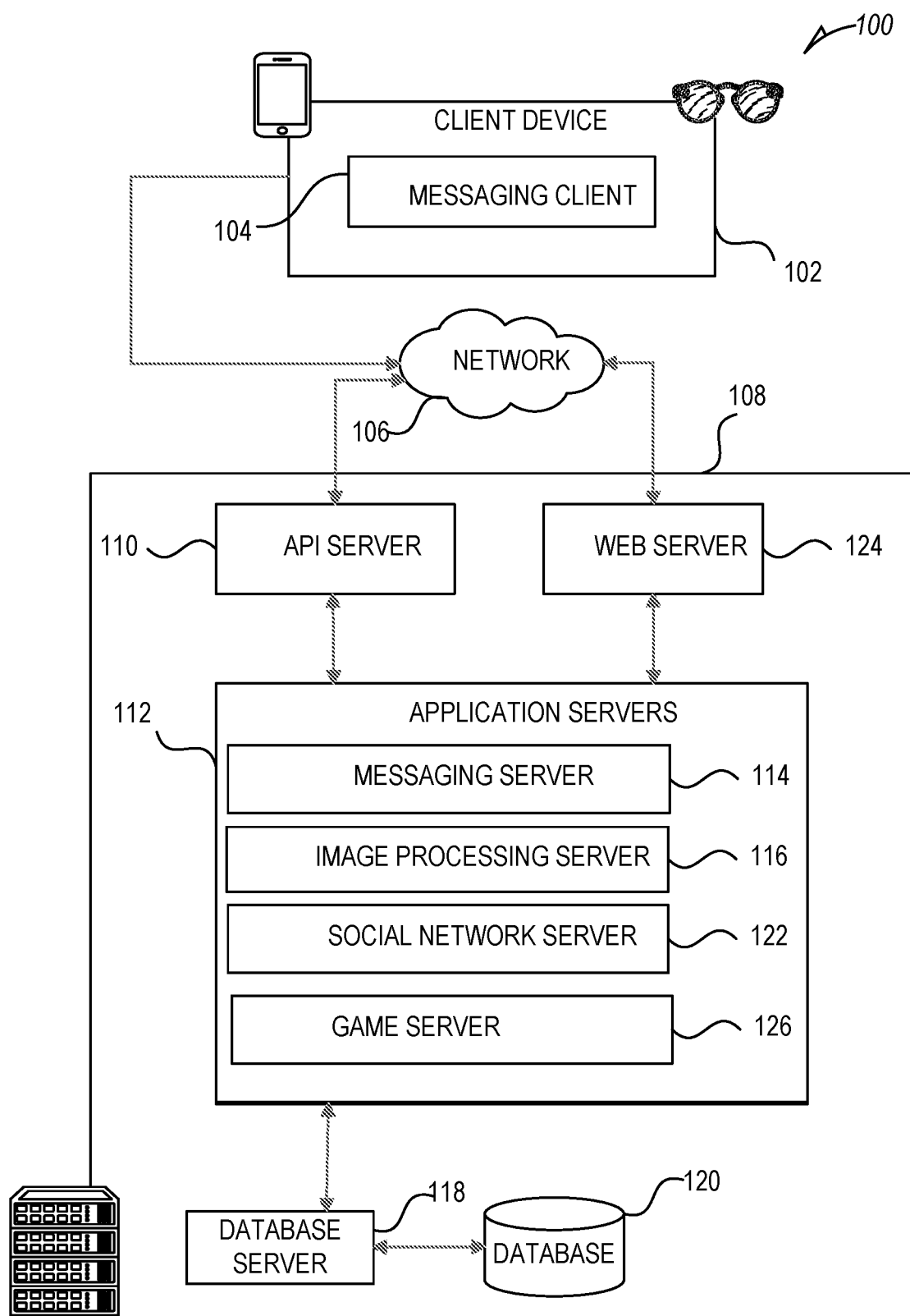
FIG. 1 is a diagrammatic representation of a networked environment in which a color calibration system may be deployed, in accordance with some examples.

Embodiments of the present disclosure improve the functionality of computer systems by enhancing usability of augmented reality (AR) software and systems.

An AR-enabled computing application, also referred to as an AR application, integrates digital visual content into the user's real-world environment. An AR-enabled computing application is configured to execute at a user device, such as a tablet, a smartphone or AR glasses. AR glasses, also referred to as AR smart glasses or merely smart glasses, are computing devices that are wearable in the same manner as a pair of glasses. AR glasses are equipped with a digital camera and digital displays, and permit the wearer to see, through the glasses' lenses, the real world as augmented by overlayed computer-generated information. Augmentation of the real-world view by overlayed computer-generated information can be achieved by combining transparent lenses with digital displays, such as light-emitting diode (LED) or organic light-emitting diode (OLED) displays. The digital displays of the AR glasses are see-through display devices that may display an AR overlay (a digital image, for example) as if it is positioned in real life in front of the wearer of the AR glasses.

Some AR applications particularly benefit from an accurate display of colors on the associated see-through display device. Existing devices for color-calibrating computer monitors are not suitable for calibrating see-through display devices, because some aspects of the colors perceived by a wearer of the AR glasses result from ambient lighting conditions. The technical challenge of color-calibrating a see-through display is addressed by providing a color calibration system. The color calibration system is configured to permit a user to adjust tint/temperature parameters while displaying a virtual color reference card on the see-through display device. Color temperature ranges between orange and blue spectrum. Tint ranges between green and magenta spectrum.

The virtual color reference card corresponds to a physical color reference card that is placed in front of the AR glasses. A physical color reference card is an arrangement of shapes of different colors. For example, a physical color reference card may be a cardboard-framed arrangement of 24 squares of painted samples. Based on the adjustments indicated by the user through the color calibration user interface (UI), the color calibration system makes changes to the properties of the see-through display device, such that the user can immediately see the effect of their color calibration efforts by comparing the changed colors in the virtual color reference card to the colors of the physical color reference card seen through the transparent lenses of the AR glasses. The user can continue adjusting the properties of the see-through display device until the colors of the virtual color reference card overlayed over the field of view of the wearer of the AR glasses match the colors of the physical color reference card seen by the wearer of the AR glasses.

The color calibration system comprises a calibration tool that uses a physical reference color card and a color calibration UI. The color calibration UI includes a virtual color reference card overlayed over the field of view of the wearer of the AR glasses user-selectable elements to color-calibrate the see-through display device.

Figure 5:
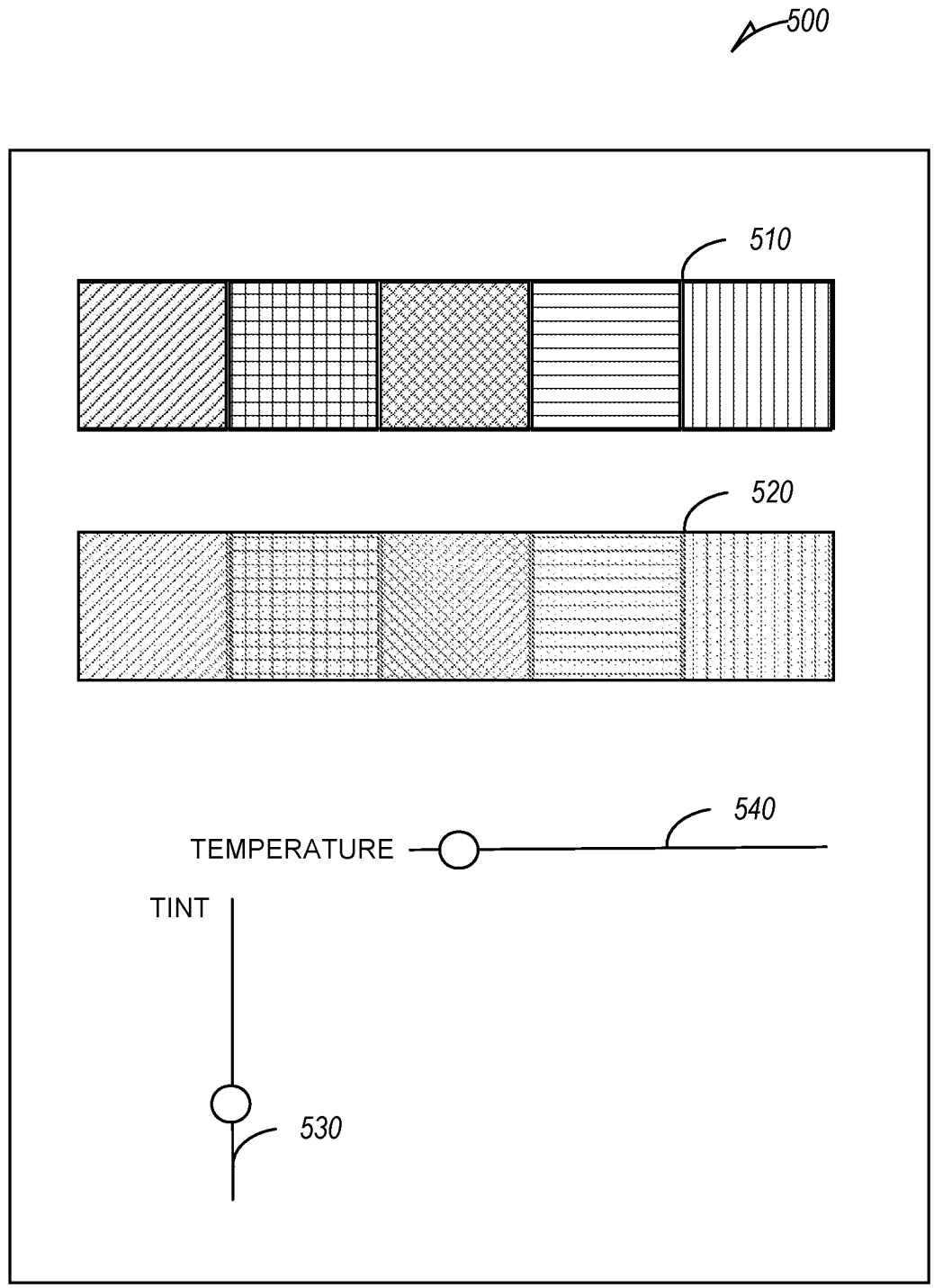
FIG. 5 illustrates view that includes a color calibration user interface (UI) and a physical color reference card as seen through AR glasses, in accordance with some examples.
Figure 6:
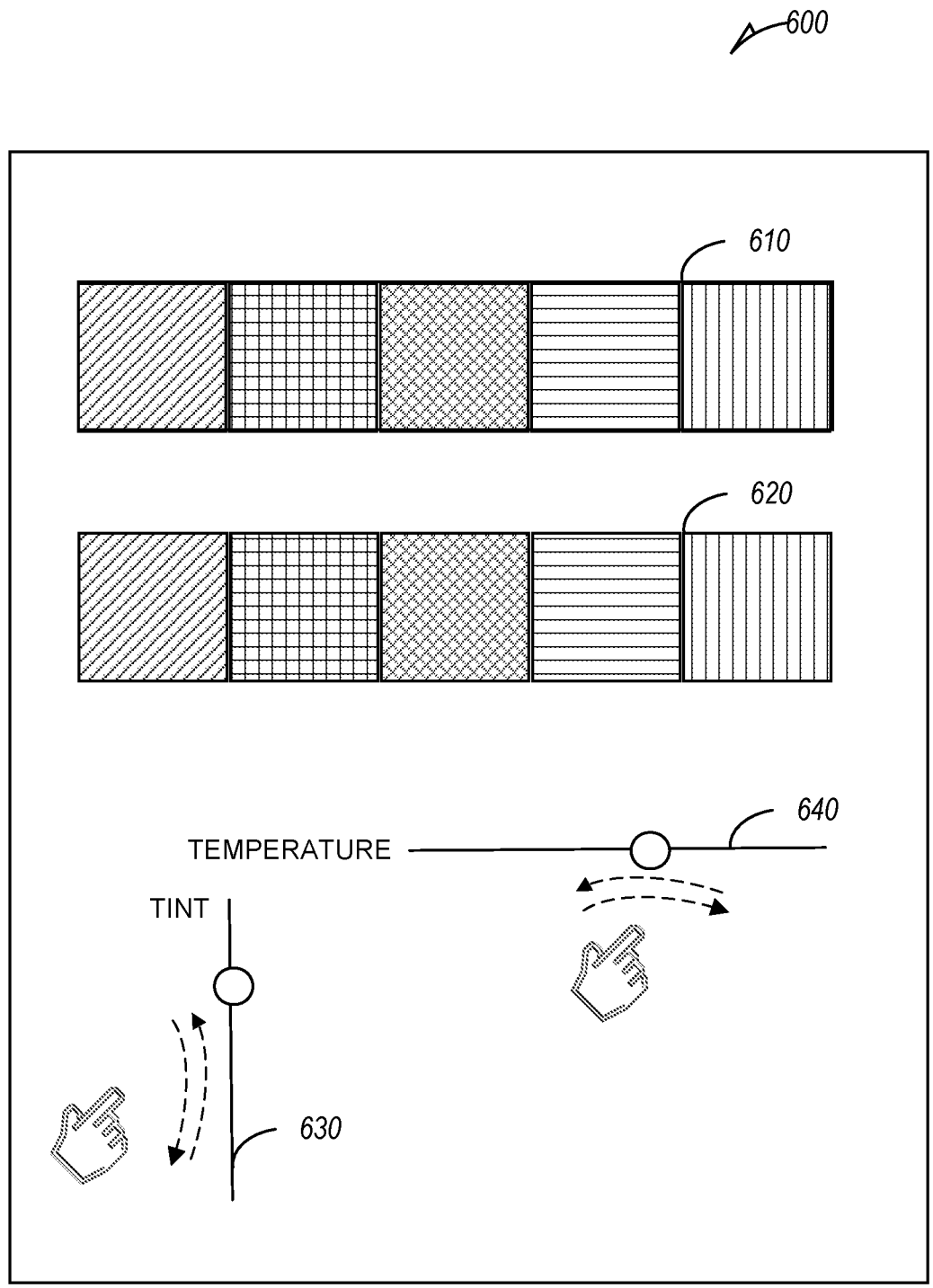
FIG. 6 illustrates a further view that includes a color calibration UI and a physical color reference card as seen through AR glasses, in accordance with some examples.

In some examples, the user-selectable elements are two sliders to control the tint and the temperature respectively. It will be noted that, while the color space includes three dimensions—tint, temperature, and brightness—the brightness of a see-through display device is fixed based on the ambient lighting conditions. When the lighting conditions change, another color calibration of the see-through display device may be needed. Examples of the color calibration UI are illustrated in FIG. 5 and FIG. 6, which are described further below.

The color calibration system can be built into the AR glasses as part of the system tools. In some examples, the color calibration system is provided by a messaging system configured to facilitate network communication between user devices.

Networked Computing Environment

FIG. 1 is a block diagram 100 showing an example messaging system for exchanging data (e.g., messages and associated content) over a network. The messaging system includes multiple instances of a messaging client 104 executing at respective client devices such as a client device 102 and a messaging server system 108. Each messaging client 104 is communicatively coupled to other instances of the messaging client 104 and a messaging server system 108 via a network 106 (e.g., the Internet). The client device 102 is a smartphone, AR glasses or another type of device that is able to display AR content.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using customized image reprocessing. Data exchanges within the messaging system are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, collectively referred to as an AR engine, which can be hosted or supported by the image processing server 116. An AR engine, in some examples, is used to facilitate the functionality provided by the color calibration tool, such as detecting a physical color reference card in a field of view of a camera of a computing device (e.g., by detecting the corresponding color reference card object in the output of the digital image sensor of the camera of the AR glasses) in and overlaying the virtual color reference card over the field of view at a location selected such as to not obscure the associated physical color reference card. The virtual color reference card is generated based on the color reference card object detected in the output of the digital image sensor of the camera of the AR glasses.

Figure 3:
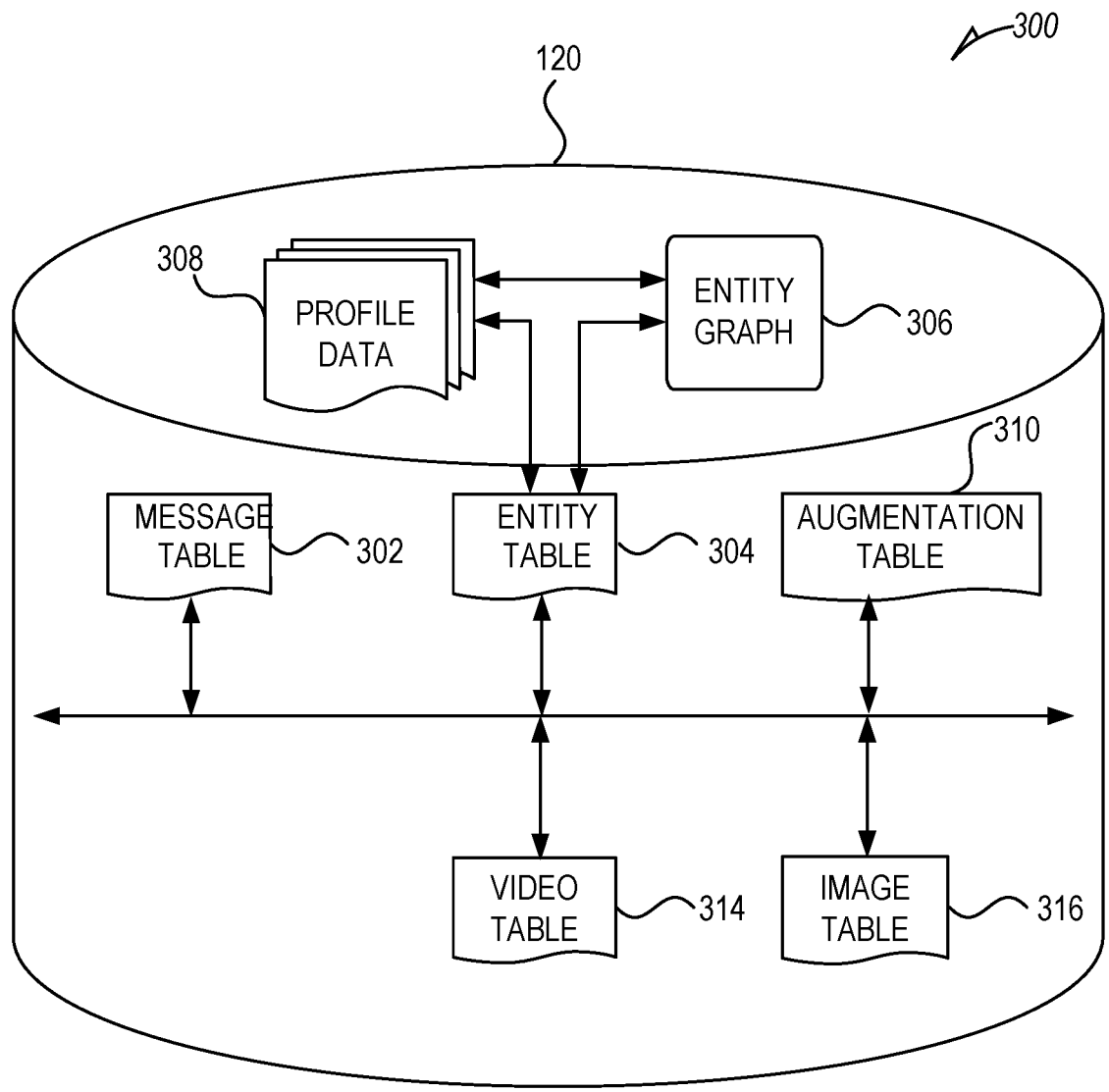
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system with which a particular user has a "friend" relationship or is "following," and also the identification of other entities and interests of a particular user.

The game server 126, in some examples, is configured as the authoritative source of user actions and the effects of user actions, also referred as events, in a multiplayer game. The game server 126 being the authoritative source of events in a multiplayer game means that each user device engaged in the same multiplayer game maintains a version of the state of the game, which is consistent with the respective versions of the state of the game available to other users via their respective user devices. In some examples, a multi-player game is an AR experience shared by multiple users. As mentioned above, the users participating in a shared AR experience session are interacting in the real world, in that they are located in substantially the same geographic area such that they can see the same real-world objects around them, even if from different angle, while also being able to manipulate the virtual object provided by the shared AR experience by interacting with the activity UI of the shared UI experience.

System Architecture

Figure 2:
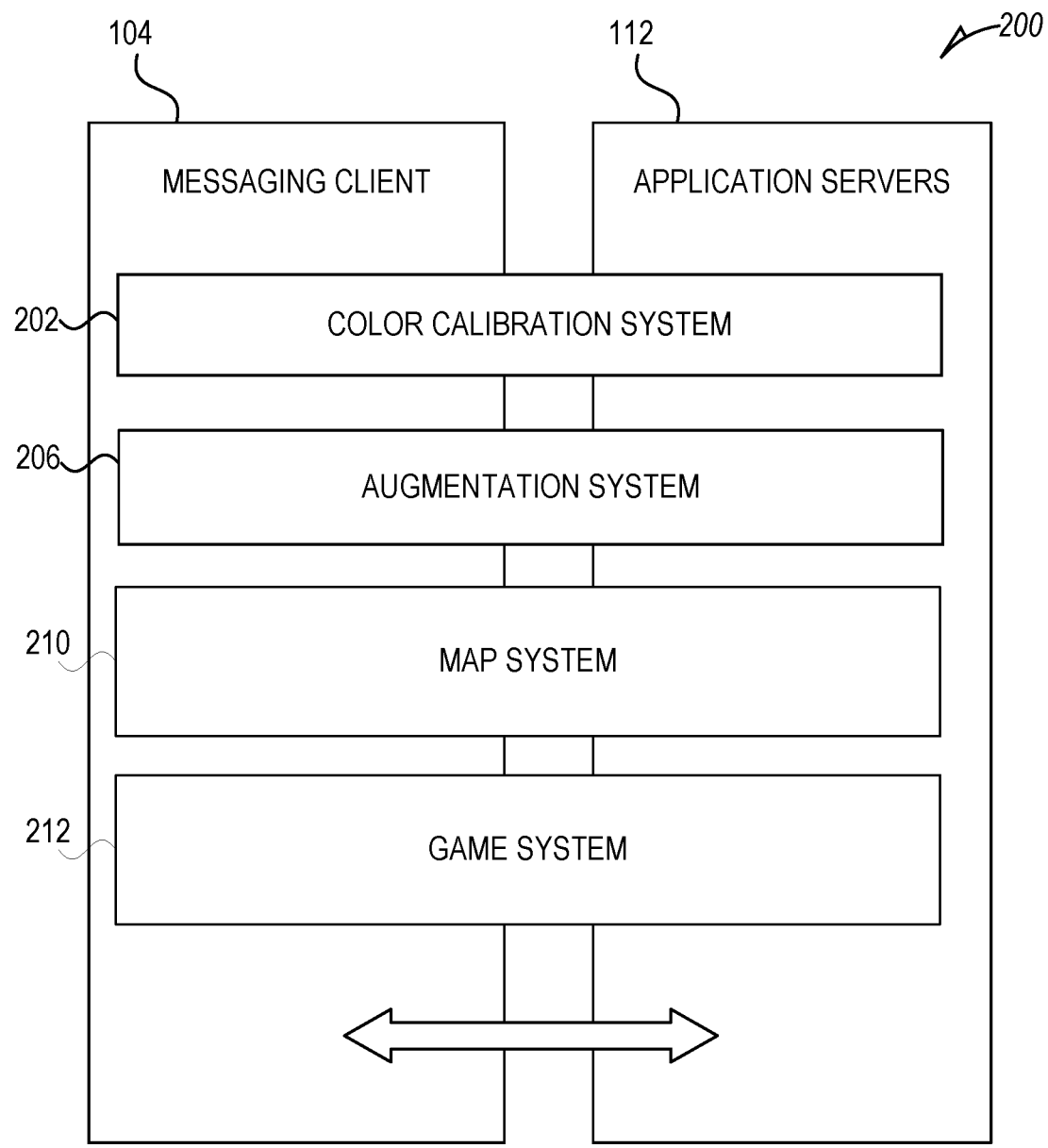
FIG. 2 is a diagrammatic representation of a messaging system, in accordance with some examples, that has both client-side and server-side functionality, and that includes a color calibration system.

FIG. 2 is a block diagram 200 illustrating further details regarding the messaging system, according to some examples. Specifically, the messaging system is shown to comprise the messaging client 104 and the application servers 112. The messaging system embodies a number of subsystems, which are supported on the client-side by the messaging client 104, and on the sever-side by the application servers 112. These subsystems include, for example a color calibration tool 202, an augmentation system 206, a map system 210, and a game system 212.

The color calibration tool 202 is configured to permit a user to adjust tint/temperature parameters while displaying a virtual color reference card on the see-through display device, as described herein. It will be noted that, in some examples, the color calibration tool 202 is hosted on the user device (e.g., the client device 102), in which case the backend for the color calibration tool 202 is a local service.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system. The media overlays may be stored in the database 120 and accessed through the database server 118.

In some examples, the augmentation system 206 is configured to provide access to AR components that can be implemented using a programming language suitable for application development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement. In some embodiments, the augmentation system 206 is used by the color calibration tool 202 as an AR engine to facilitate detecting a physical color reference card in a field of view of a camera of a computing device and overlaying the corresponding virtual color reference card over the field of view at a location selected such as to not obscure associated physical the color reference card.

The map system 210 provides various geographic location functions, and supports the presentation of map-based media content and messages by the messaging client 104. For example, the map system 210 enables the display of user icons or avatars (e.g., stored in profile datfor a 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100, including AR experiences that may utilize beneficially the color calibration tool 202.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

Figure 4:
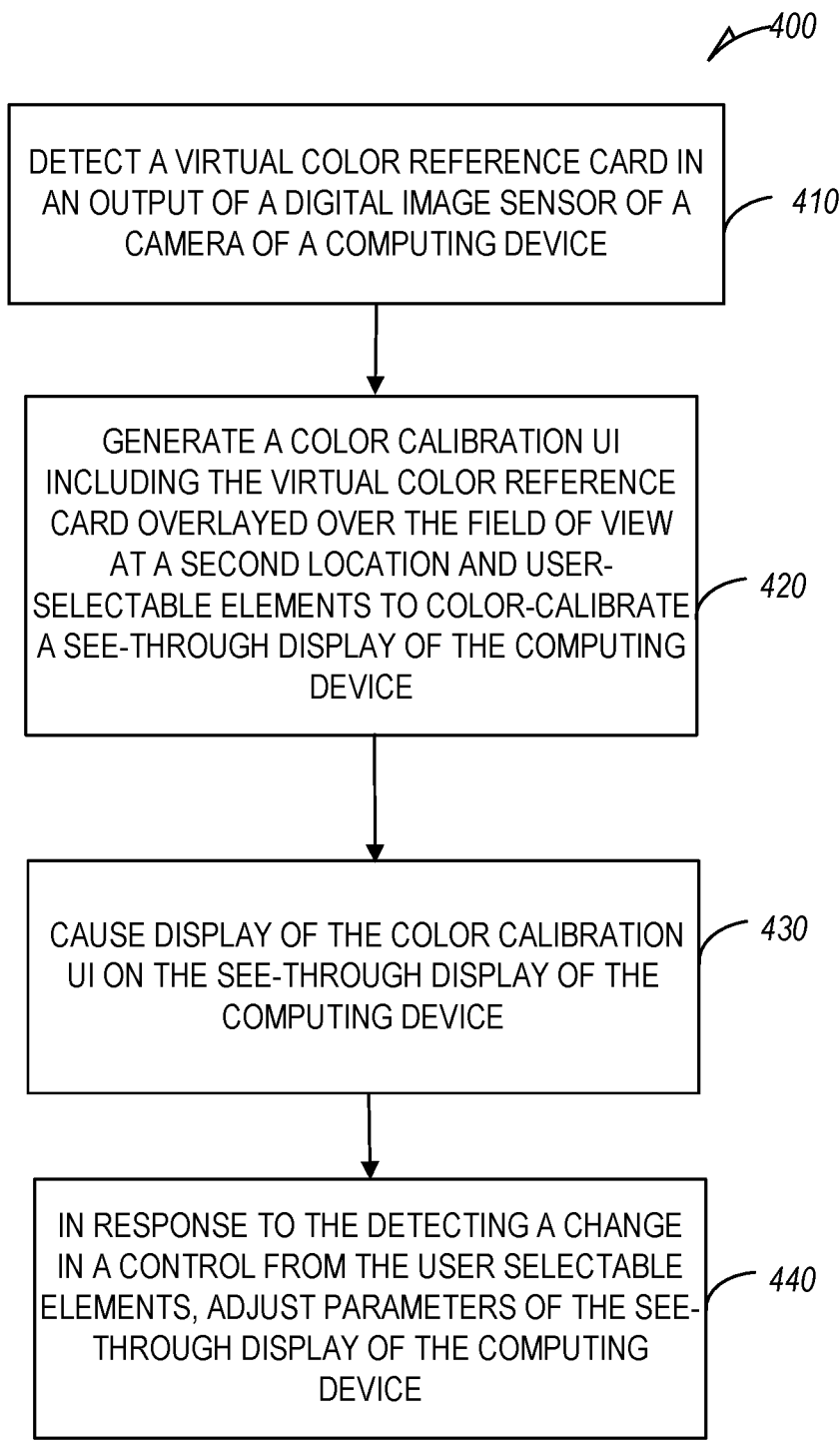
FIG. 4 is a flowchart of a method performed by a color calibration system, in accordance with some examples.

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. As explained above, users in the messaging system are represented by respective profiles storing information pertaining to the associated users. The profile data 308 may be selectively used and presented to other users of the messaging system, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations).

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a virtual color reference card generated by the color calibration tool 202 based on the representation of the physical color reference card in the output of the digital image sensor of the camera of a computing device.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Process Flow

In one example embodiment, some or all processing logic resides at the client device 102 of FIG. 1 and/or at the messaging server system 108 of FIG. 1. The method 400 commences at operation 410, when the color calibration system 202 of FIG. 2 detects a virtual color reference card in an output of a digital image sensor of a camera of a computing device. The computing device, which is a pair of AR glasses in some examples, comprises a see-through display that is positioned substantially in the field of view of the camera. The field of view of a camera defines an area of a real-world environment that the camera can capture. The virtual color reference card represents a physical color reference object that can be seen through the transparent lenses of the AR glasses. In some examples, the virtual color reference card may be detected by identifying at least a predetermined number of different colors in substantially adjacent locations in the output of the digital image sensor of the computing device.

At operation 420, the color calibration system 202 generates a color calibration UI. The color calibration UI includes the virtual color reference card and user-selectable elements to color-calibrate the see-through display. In the real-world environment, the physical color reference object is positioned at a certain location in the field of view of the camera of the computing device. The virtual color reference card is overlayed over the field of view at a second location, such that it does not obscure the view of the physical virtual color reference card through the transparent lenses of the AR glasses, as is shown in FIG. 5 and FIG. 6 that are described further below. As explained above, the positioning of the virtual color reference card is overlayed over the field of view at a second location permits the user to compare the colors in the virtual color reference card with the colors in the physical reference card, as the user adjusts the color parameters of the display device. The user-selectable elements that can be used to color-calibrate the see-through display are in the form of sliders. In some examples, the first control from the user-selectable elements is a vertically oriented slider that can be used to adjust the tint. For example, the first control may be configured to select from a plurality of tints including red, green and blue. The second control from the user-selectable elements is a horizontally oriented slider to adjust temperature of a tint indicated by a setting of the first control. In some examples, the color calibration UI does not include a control for adjusting brightness.

At operation 430, the color calibration system 202 causes displaying of the color calibration UI on the see-through display of the computing device.

A user can adjust the tint and temperature by interacting with the user-selectable elements by means of hand gestures. In some examples, when the fingers are detected in the output of the digital sensor of the camera, a hand gesture can be recognized using a simple rule classifier. In the rule classifier, the hand gesture is predicted according to the number and content of fingers detected. The color calibration system 202 detects a user interaction with a user-selectable element and, in response, effectuates a change to the control such that the change to the control is visible in the color calibration UI. For example, the color calibration system 202 causes the user-selectable element to move in response to the detected user interaction of the user-selectable element. The color calibration system 202 adjusts parameters of the see-through display of the computing device in response to detecting the change to the user selectable element, such as the change in the position of the slider controlling the tint and/or the change in the position of the slider controlling the temperature. The user can continue adjusting the properties of the see-through display device by interacting with the user-selectable elements in the color calibration UI, until the colors of the virtual color reference card overlayed over the field of view of the wearer of the AR glasses match the colors of the physical color reference card seen by the wearer of the AR glasses.

User Interface

FIG. 5 illustrates a view 500, in accordance with some examples. The view 500 includes a physical color reference card 510 as seen through AR glasses and a color calibration UI that includes a virtual color reference card 520, a vertically oriented slider 530 that can be used to adjust the tint and a horizontally oriented slider 540 to adjust temperature of a tint indicated by a setting of the first control. Different patterns in the cells of the physical color reference card 510 and the virtual color reference card 520 represent different colors. In the virtual color reference card 520, the patterns are similar but not the same as in the physical color reference card 510, as is indicated by added dots in each pattern in the virtual color reference card 520. Adjusting the properties of the see-through display device, the tint/temperature values, results a more accurate display of colors, which can be evaluated by comparing the resulting display of the virtual color reference card 520, as shown in FIG. 6.

FIG. 6 illustrates a further view 600 that includes a physical color reference card 610 as seen through AR glasses and a color calibration UI and that includes a virtual color reference card 620, a vertically oriented slider 630 that can be used to adjust the tint and a horizontally oriented slider 640 to adjust temperature of a tint indicated by a setting of the vertically oriented slider 630.

The view 600 also shows a visualization of a horizontal hand gesture by the curved arrows pointing up/down and the stylized pictures of a hand next to the vertically oriented slider 630 that can be used to adjust the tint. The view 600 also shows a visualization of a horizontal hand gesture by the curved arrows pointing right/left and the stylized pictures of a hand the stylized pictures of a hand next to the horizontally oriented slider 640 to adjust temperature of a tint indicated by a setting of the vertically oriented slider 630.

While in FIG. 5 the respective patterns in the cells of the physical color reference card 510 and the virtual color reference card 520 are similar but not the same, as is indicated by added dots in each pattern in the virtual color reference card 520, in FIG. 6 the respective patterns in the cells of the physical color reference card 510 and the virtual color reference card 520 are the same, as the result of the color adjustment.

Machine Architecture

Figure 7:
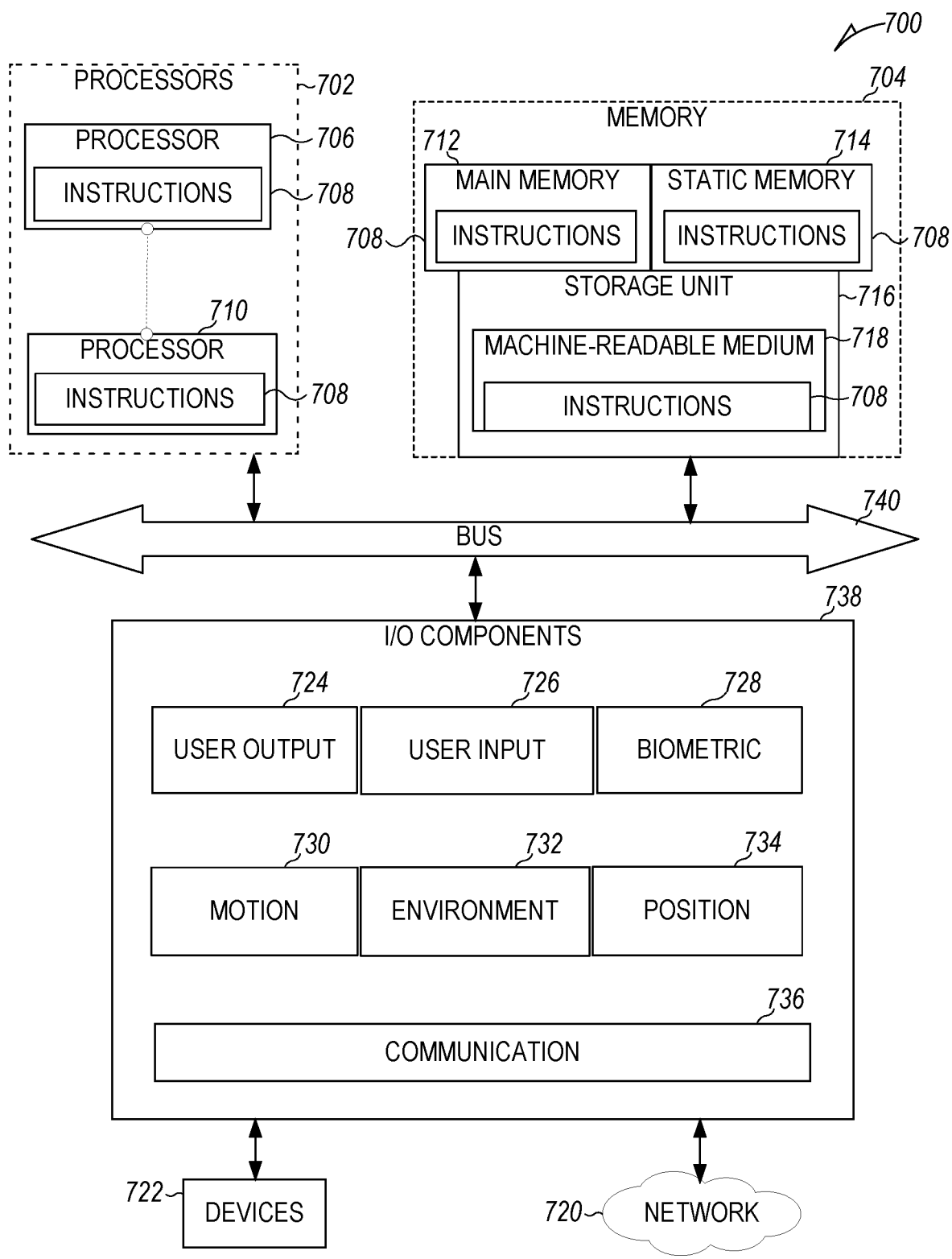
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 608 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein. The machine 700, for example, may comprise the client device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 702, memory 704, and input/output I/O components 738, which may be configured to communicate with each other via a bus 740. In an example, the processors 702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single-core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 740. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the Processor's cache memory), or any suitable combination thereof, during execution thereof by the machine 700.

The I/O components 738 may include a wide variety of components to receive input, provide output, produce output, transmit information, exchange information, capture measurements, and so on. The specific I/O components 738 that are included in a particular machine will depend on the type of machine. For example, portable machines such as mobile phones may include a touch input device or other such input mechanisms, while a headless server machine will likely not include such a touch input device. It will be appreciated that the I/O components 738 may include many other components that are not shown in FIG. 7. In various examples, the I/O components 738 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 738 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 738 further include communication components 736 operable to couple the machine 700 to a network 720 or devices 722 via respective coupling or connections. For example, the communication components 736 may include a network interface Component or another suitable device to interface with the network 720. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 712, static memory 714, and memory of the processors 702) and storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed examples.

The instructions 708 may be transmitted or received over the network 720, using a transmission medium, via a network interface device (e.g., a network interface component included in the communication components 736) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 722.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 702 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method to calibrate a head-worn computing device with a see-through display and transparent lens, the method comprising:
   detecting a physical color reference card in an output of a digital image sensor of a camera of the head-worn computing device by identifying in the output of the digital image sensor of the camera a portion of the output corresponding to the physical color reference card positioned at a first location in a field of view of the camera and having at least a predetermined number of different colors in substantially adjacent locations;

in response to detecting the physical color reference card, generating a color calibration user interface (UI) including a virtual color reference card and having user-selectable elements to color-calibrate the see-through display by updating one or more values of one or more color parameters used by the see-through display in color rendering; and causing display of the color calibration UI on the see-through display of the computing device, wherein i) the virtual color reference card is displayed at a second location, proximate to the physical color reference card, when the physical color reference card is in the field of view of the camera, such that the virtual color reference card does not obscure the view of the physical color reference card through the transparent lens of the head-worn computing device, and ii) the virtual color reference card is rendered with the one or more color parameters having a first set of values; and receiving user input via an interaction with a user-selectable element of the color calibration UI, and in response, updating the one or more color parameters of the see-through display to have a second set of values, thereby adjusting the color rendering of the virtual color reference card.

2. The method of claim 1, wherein a first control from the user-selectable elements is a vertically oriented slider to adjust tint.

3. The method of claim 2, wherein the first control is to select from a plurality of tints including red, green and blue.

4. The method of claim 1, wherein a second control from the user-selectable elements is a horizontally oriented slider to adjust temperature of a tint indicated by a setting of a first control from the user-selectable elements.

5. The method of claim 1, comprising:
detecting a user interaction with a control from the user-selectable elements; and
in response to the detecting, effectuating a change to the control from the user-selectable elements.

6. The method of claim 5, wherein the user interaction is a hand gesture.

7. The method of claim 1, wherein the head-worn computing device is AR glasses.

8. The method of claim 1, wherein the color calibration UI does not include a control for adjusting brightness.

9. A head-worn computing device, comprising:
a camera;
a see-through display;
a transparent lens;
one or more processors; and
a non-transitory computer readable storage medium comprising instructions that when executed by the one or more processors cause the one or more processors to perform operations comprising:
detecting a physical color reference card in an output of a digital image sensor of the camera of the head-worn computing device by identifying in the output of the digital image sensor of the camera a portion of the output corresponding to the physical color reference card positioned at a first location in a field of view of the camera and having at least a predetermined number of different colors in substantially adjacent locations;
in response to detecting the physical color reference card, generating a color calibration user interface (UI) including a virtual color reference card and having user-selectable elements to color-calibrate the see-through display by updating one or more values of one or more color parameters used by the see-through display in color rendering; and
causing display of the color calibration UI on the see-through display of the computing device, wherein i) the virtual color reference card is displayed at a second location, proximate to the physical color reference card, when the physical color reference card is in the field of view of the camera, such that the virtual color reference card does not obscure the view of the physical color reference card through the transparent lens of the head-worn computing device, and ii) the virtual color reference card is rendered with the one or more color parameters having a first set of values; and
receiving user input via an interaction with a user-selectable element of the color calibration UI, and in response, updating the one or more color parameters of the see-through display to have a second set of values, thereby adjusting the color rendering of the virtual color reference card.

10. The head-worn computing device of claim 9, wherein a first control from the user-selectable elements is a vertically oriented slider to adjust tint.

11. The head-worn computing device of claim 10, wherein the first control is to select from a plurality of tints including red, green and blue.

12. The head-worn computing device of claim 9, wherein a second control from the user-selectable elements is a horizontally oriented slider to adjust temperature of a tint indicated by a setting of a first control from the user-selectable elements.

13. The head-worn computing device of claim 9, comprising:
detecting a user interaction with a control from the user-selectable elements; and
in response to the detecting, effectuating a change to the control from the user-selectable elements.

14. The head-worn computing device of claim 13, wherein the user interaction is a hand gesture.

15. The head-worn computing device of claim 9, wherein the head-worn computing device is AR glasses.

16. A machine-readable non-transitory storage medium having instruction data executable by a machine to cause the machine to perform operations for calibrating a head-worn computing device with a see-through display and a transparent lens, the operations comprising:
detecting a physical color reference card in an output of a digital image sensor of a camera of the head-worn computing device by identifying in the output of the digital image sensor of the camera a portion of the output corresponding to the physical color reference card positioned at a first location in a field of view of the camera and having at least a predetermined number of different colors in substantially adjacent locations;
in response to detecting the physical color reference card, generating a color calibration user interface (UI) including a virtual color reference card and having user-selectable elements to color-calibrate the see-through display by updating one or more values of one or more color parameters used by the see-through display in color rendering; and
causing display of the color calibration UI on the see-through display of the computing device, wherein i) the virtual color reference card is displayed at a second location, proximate to the physical color reference card, when the physical color reference card is in the field of view of the camera, such that the virtual color reference card does not obscure the view of the physical color reference card through the transparent lens of the head-worn computing device, and ii) the virtual color reference card is rendered with the one or more color parameters having a first set of values; and receiving user input via an interaction with a user-selectable element of the color calibration UI, and in response, updating the one or more color parameters of the see-through display to have a second set of values, thereby adjusting the color rendering of the virtual color reference card.

\* \* \* \* \*